Dec. 3, 1957 J. A. HENDERSON ET AL 2,815,113
ARTICLE POSITIONING APPARATUS
Filed May 13, 1954 3 Sheets-Sheet 1

INVENTORS
JOHN A. HENDERSON
IRVING R. LEWIS JR.
BY FRITHJOF A. SCOTT

Leo C. Krazinski
ATTORNEY

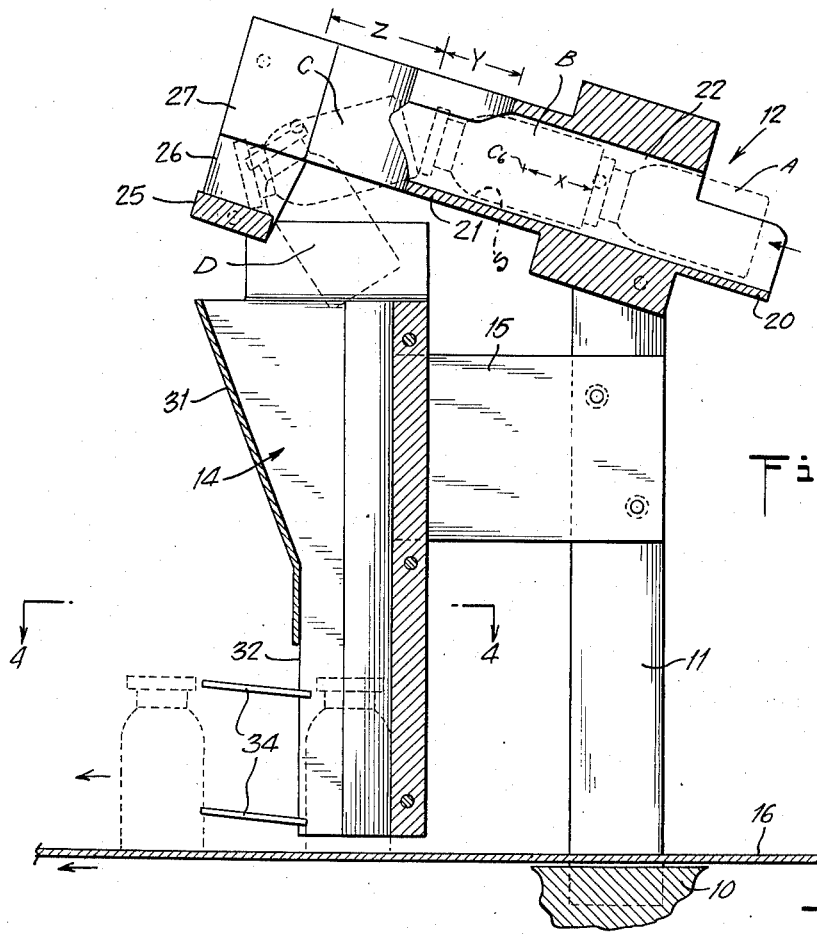
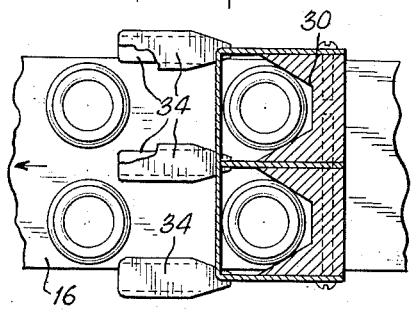
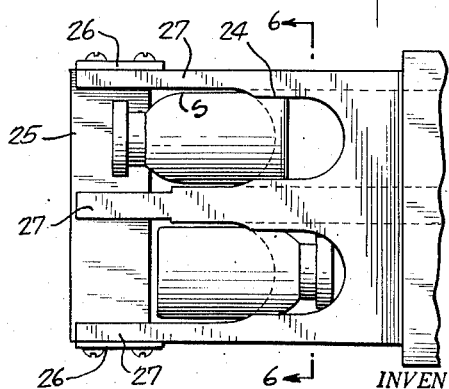
INVENTORS
JOHN A. HENDERSON
IRVING R. LEWIS JR
FRITHJOF A. SCOTT
BY Leo C. Krazinski
ATTORNEY Dec. 3, 1957  J. A. HENDERSON ET AL  2,815,113
ARTICLE POSITIONING APPARATUS
Filed May 13, 1954  3 Sheets-Sheet 3

INVENTORS
JOHN A. HENDERSON
IRVING R. LEWIS JR.
BY FRITHJOF A. SCOTT

Leo C. Krazinski
ATTORNEY

United States Patent Office 2,815,113
Patented Dec. 3, 1957

2,815,113

ARTICLE POSITIONING APPARATUS

John A. Henderson, Highland Park, Irving R. Lewis, Jr., Metuchen, and Frithjof A. Scott, Cranford, N. J., assignors to Merck & Co., Inc., a corporation of New Jersey Application May 13, 1954, Serial No. 429,608

13 Claims. (Cl. 198—33)

The present invention relates to article positioning apparatus and, more particularly, to apparatus for orienting elongate articles having a base and a top.

By way of example, such apparatus is useful in connection with machinery for automatically filling bottles and the like where it is imperative that each bottle be in an upright position to make filling thereof possible. This problem is encountered where the bottles are relatively small and are delivered from a hopper in haphazard relation to a chute for feeding the same to the conveyor supplying the filling machine, there being no assurance that the bottles are fed base first onto the conveyor.

Accordingly, an object of the present invention is to provide such apparatus which is simple and economical in construction and practical and reliable in operation.

Another object is to provide such apparatus which is particularly adapted for orienting small bottles and the like.

A further object is to provide such apparatus which is particularly accurate in discriminating between the necks and bases of battles and the like.

A still further object is to provide such apparatus which is capable of orienting the aforementioned articles even if the distance between the base and the top thereof varies due to manufacturing inaccuracies.

Other and further objects will be obvious upon an understanding of the illustrative embodiment about to be described, or will be indicated in the appended claims, and various advantages not referred to herein will occur to one skilled in the art upon employment of the invention in practice.

In the drawings:

Fig. 3 is a sectional view taken along the line 3—3 on Fig. 1.

Fig. 4 is a sectional view taken along the line 4—4 on Fig. 3.

Fig. 5 is a fragmentary plan view illustrating articles prior to orientation thereof.

Figure 1:
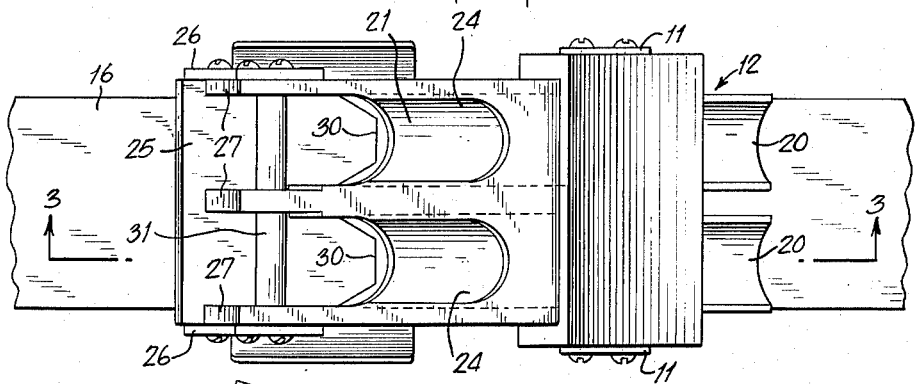
Fig. 1 is a plan view of article positioning apparatus, illustrating one embodiment of the present invention.
Figure 2:
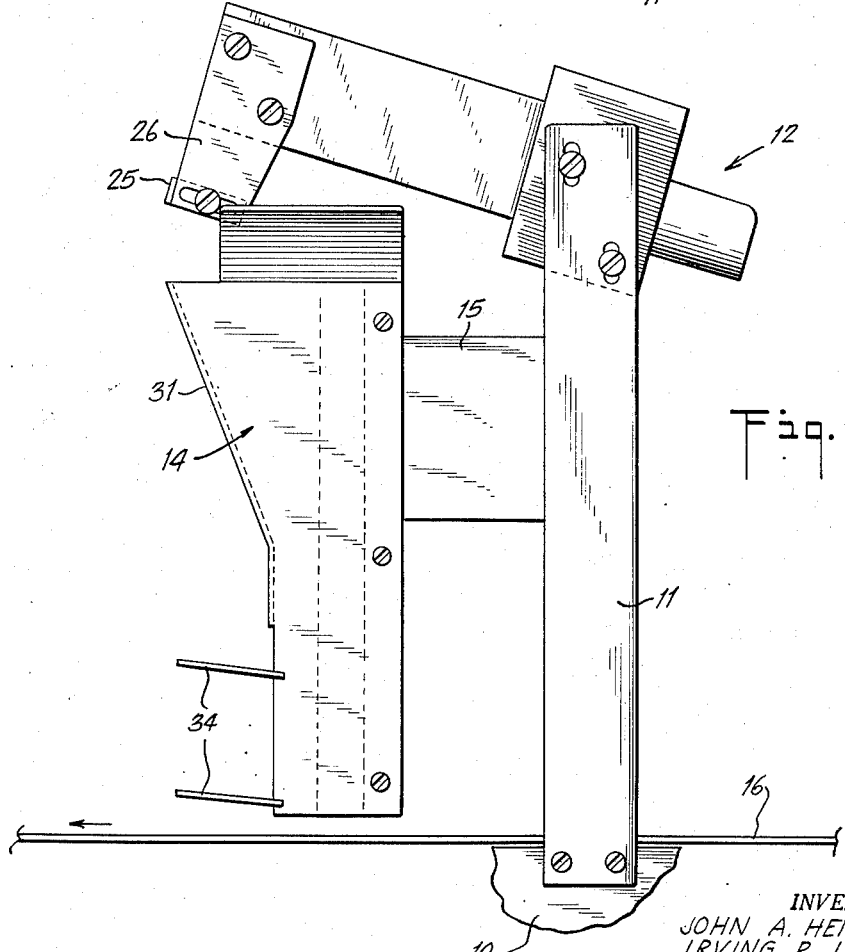
Fig. 2 is a side elevational view of the apparatus shown in Fig. 1.

Referring in detail to Figs. 1 to 6 of the drawings, there is shown apparatus which generally comprises a base 10, upright frame members 11 secured to the base, chutes 12 adjustably mounted on the upper ends of the frame members, hoppers 14, bracket members 15 connected to the upright members for supporting the hoppers, and a movable conveyor 16 passing beneath the hopper. Two chutes and two hoppers are shown herein to illustrate that the apparatus is adapted for handling a plurality of rows of articles, such as bottles, although it will be understood that the apparatus is equally capable of handling a single row of bottles. Since the chutes and hoppers are substantially identical in construction, only one of them will be described in detail.

The bottles shown herein by way of example are generally cylindrical and comprise a base and a neck formed with an annular recess between the shoulder of the body and the bead at the mouth thereof. The distance X (Fig. 3) indicates the distance between the base and the center of gravity CG of the bottle.

The chute 12, as shown, is inclined upwardly in the direction the bottles are moved thereon, so that the articles cannot slide forwardly because of gravity and interfere with the orientation thereof. It will be understood that this can be achieved by having the chute level or inclined only slightly downwardly, whereby the effect of gravity is overcome by the friction between the bottles and the chute. However, the arrangement shown is preferred to assure end to end contact between adjacent bottles in being moved along the chute by a pushing mechanism (not shown) which is positioned at the location where the bottles are supplied by a hopper (not shown) to the chute.

The chute comprises arcuate sections 20 and 21 at each end thereof for accommodating cylindrical bottles, the upper or delivery end of the section 21 being located above the hopper 14 in vertical alignment with the back thereof, and an intermediate throat section 22 through which the bottles are adapted to pass in close fitting relation, the exit end of the throat being spaced the distance Y from the delivery end of the chute, which distance is about equal to the distance X for the purpose to be described hereinafter.

Figure 6:
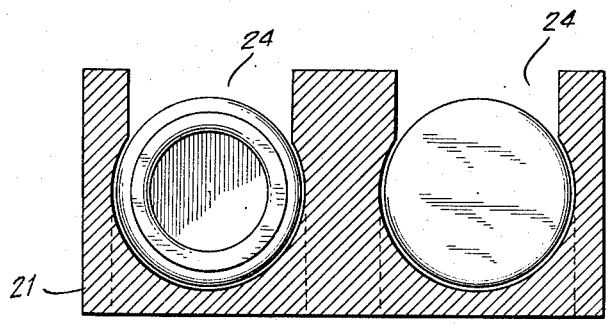
Fig. 6 is an enlarged sectional view taken along the line 6—6 on Fig. 5.

While this throat may be cylindrical from entrance end to exit end, a recess 24 (Figs. 1 and 5) preferably is provided in the top thereof which is slightly less in width than the width or diameter of the throat section 22 but is of a width to enable the bottle necks to pass therethrough in the manner described hereinafter (Figs. 5 and 6).

A support 25, shown in Figs. 1, 3 and 5 as a bar inclined in the same direction as the chute, is positioned above the front end of the hopper 14 at a level lower than the delivery end of the chute section 21 and is spaced from this delivery end a distance slightly less than the overall length of the bottles. This support is adapted to be engaged by the neck of the bottles leaving the chute neck first and causes such bottles to fall into the hopper base first. In order to simplify the construction of the apparatus shown, the support 25 is mounted on the chute by side plates 26 connected to side portions 27 of the chute extending beyond the chute delivery end.

The hopper 14, as shown in Figs. 3 and 4, has a back formed with a bottle receiving groove 30 and has a downwardly converging front 31 for cooperating with the back to right the bottles. The front is formed at its lower end with an opening 32 through which the bottles pass after being deposited on the conveyor 16. Guides 34 carried by the sides of the hopper at the lower portion thereof align the bottles on the conveyor as they leave the hopper.

The operation of the apparatus described with reference to Figs. 1 to 6 is best illustrated by Figs. 3, 4 and 5. When bottles are moved along the chutes bottom first (Fig. 5) to a position where the center of gravity thereof is outwardly beyond the delivery end of the chute section 21, the upper ends of the bottles, including the shoulders S, are within the confinement of throat section 22 and recess 24 or just about clear thereof, and the bottles are free to tilt into upright position upon slight further movement along the chute. The bottles then slide off the delivery end of the chute section 21 and drop bottom first into the hopper 14 for delivery to the conveyor without contacting the support 25 (Fig. 3).

In the event the center of gravity should be nearer the neck end than the base of the bottle, the bottles are released from the chute in the same manner because the neck end is beyond the slot or recess 24 and the bottles are free to tilt base down at the moment the center of gravity is at or slightly beyond the free edge of the chute 21.

When bottles are moved along the chutes neck first, they progressively reach the positions shown in Fig. 3. After passing through the throat 22, the bottom of the bottle does not leave the slot 24 until the center of gravity thereof approaches the delivery end of the chute section 21. As the center of gravity reaches a position outwardly beyond the chute edge, the upper end of the bottle is almost above the support 25 and upon slight further movement the bottle tilts neck down, whereupon the neck end engages the support 25 and the bottom end rests on the free edge of the chute section 21. Still further movement of the bottle causes the neck end to slide up on the support 25 and the bottom end to clear the chute edge, whereby the bottle tilts into upright position, drops down the hopper and then lands on the conveyor. The bottles are released in this manner, when leaving the slot 24 neck first, regardless of the location of the center of gravity.

Figures 7, 8:
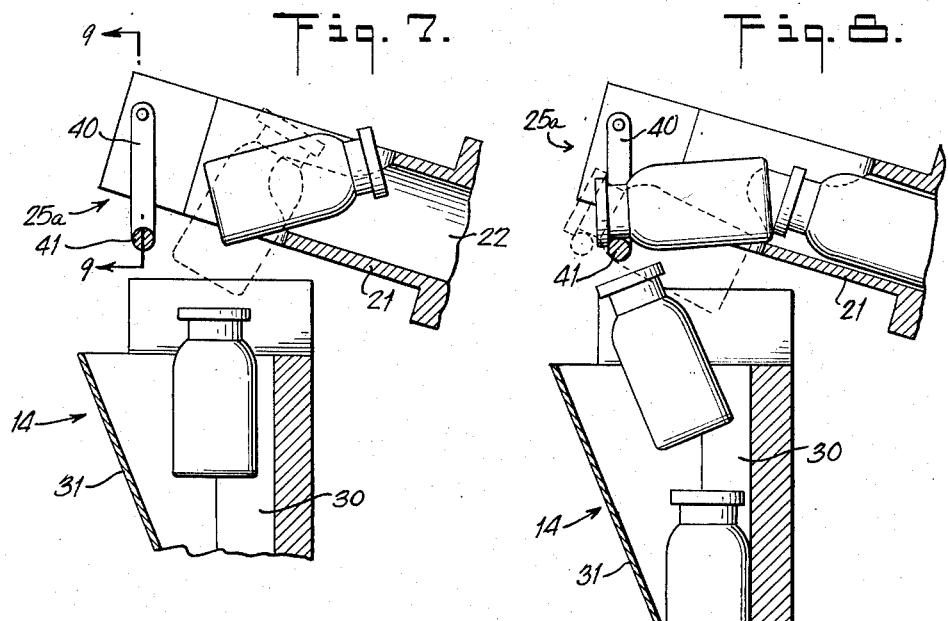
Fig. 7 is a fragmentary sectional view similar to Fig. 3 illustrating another embodiment of the invention with an article being moved base first.
Fig. 8 is a view similar to Fig. 7 with an article being moved top first and oriented for further movement base first.
Figure 9:
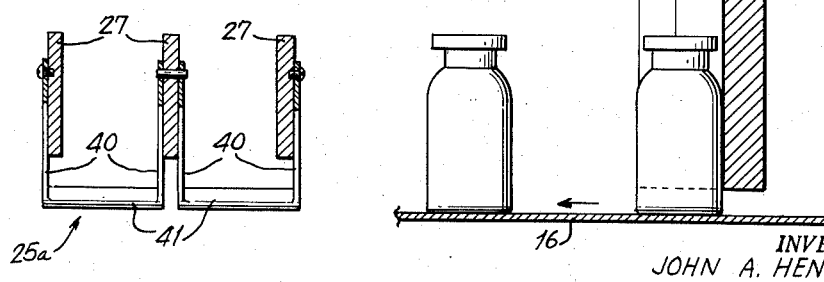
Fig. 9 is a sectional view taken along the line 9—9 on Fig. 7.

In Figs. 7 to 9, a slightly different support is illustrated, with like reference numerals applied to like parts already described. Instead of being fixed, the support is movable. This is accomplished by swingingly mounting a trapeze 25a serving as the support. This trapeze comprises a pair of side members 40, pivotally connected at their upper ends to side portions 27 of the chute, and a cross-bar 41 secured between the lower ends of the side members 40. The cross-bars preferably are cylindrical or have an arcuate upper surface adapted to be received by the recess between the bead and shoulder of the bottles. The cross-bar surface engaged by the bottles may be of rubber or some other material which provides friction between it and the bottles to minimize any tendency for the bottles to slide freely thereon.

In the operation, when bottles are moved along the chutes bottom first, as shown in Fig. 7, they are delivered in upright position to the hopper 14 without contacting the trapeze 25a in the same manner as already described. When bottles are moved along the chute neck first, as shown in Fig. 8, they assume the various positions described with reference to Fig. 3 except that, upon tilting while the bottom end is still supported by the free edge of the chute section 21, the neck end drops on the trapeze cross-bar 41 with the latter in the bottle recess, as shown. Upon slight further movement to a position whereby the bottom end clears the chute edge, the trapeze swings to the left, as viewed, with the cross-bar remaining in the bottle recess. After the bottom end has cleared the chute edge as shown in broken lines, the bottle pivots about the cross-bar into upright position for delivery to the hopper 14. After the bottles fall away, the trapeze swings back to its initial position.

The arrangement illustrated in connection with Figs. 7 to 9 and described is particularly useful when the overall height of the bottles varies somewhat because of manufacturing variations. To compensate for such variations, the trapeze cross-bar is located to be engaged by the recess zone of bottles having a minimum overall height. When bottles of average or maximum overall height drop on the trapeze, the shoulder of the bottle contacts the cross-bar first and tends to push the same into the recess, whereby in every instance the cross-bar is properly engaged for swinging movement thereof with the bottles thereon to assure tilting of the bottles into upright position when the bottom end thereof clears the chute edge.

From the foregoing description, it will be seen that the present invention provides article positioning apparatus which is simple and economical in construction and reliable in operation. The apparatus is adapted to handle a high rate of bottles or the like to meet the supply demands of fast operating, modern filling and bottling machinery. The apparatus is devoid of parts likely to get out of adjustment or require repair, and can readily withstand such usage to which it is subjected.

As various changes may be made in the form, construction and arrangement of the parts herein, without departing from the spirit and scope of the invention and without sacrificing any of its advantages, it is to be understood that all matters are to be interpreted as illustrative and not in any limiting sense.

What we claim is:

1. Apparatus for orienting haphazardly disposed elongate articles having a base and a top comprising a chute for passage of the articles in contiguous relationship with each article pushing the article ahead of it, a throat adjacently spaced from a delivery end of said chute through which the articles pass in close fitting relation before reaching said delivery end, said throat having a slot at an upper surface thereof less than the width of said base and greater than the width of said top, a hopper below and adjacent the delivery end of said chute, and a support above said hopper at a level lower than the delivery end of said chute and separated by an open space from the delivery end of said chute, said support being adapted to be engaged by the top of the articles upon leaving said chute top first and thereby cause said articles to fall into said hopper base first, said articles leaving said chute base first passing freely through said open space into said hopper without engaging said support.

2. Apparatus according to claim 1, wherein said support is fixed.

3. Apparatus for orienting haphazardly disposed elongate articles having a base and a top comprising a chute for the articles, a throat adjacently spaced from a delivery end of said chute through which the articles pass in close fitting relation before reaching said delivery end, a hopper below and adjacent the delivery end of said chute, and a swingingly mounted support above said hopper at a level lower than the delivery end of said chute and separated by an open space from the delivery end of said chute, said support being adapted to be engaged by the top of the articles upon leaving said chute top first and thereby cause said articles to fall into said hopper base first, said articles leaving said chute base first passing freely through said open space into said hopper without engaging said support.

4. Apparatus for orienting haphazardly disposed elongate articles having a base and a top with the center of gravity closer to the base than the top, said apparatus comprising a chute for passage of the articles in contiguous relationship with each article pushing the article ahead of it, said chute being inclined upwardly in the direction the articles are moved thereon, a throat adjacently spaced from the upper end of said chute through which the articles pass in close fitting relation before reaching said upper end, said throat having a slot at an upper surface thereof less than the width of said base and greater than the width of said top, a hopper below and adjacent the upper end of said chute, and a support above said hopper at a level lower than the upper end of said chute and separated by an open space from the upper end of said chute, said support being adapted to be engaged by the top of the articles upon leaving said chute top first and thereby cause said articles to fall into said hopper base first, said articles leaving said chute base first passing freely through said open space into said hopper without engaging said support.

5. Apparatus according to claim 4, wherein the upper end of said chute is spaced from said throat a distance about equal to the distance the center of gravity is located from the base of the articles.

6. Apparatus according to claim 4, wherein said support is spaced from the upper end of said chute a distance greater than the distance between the center of gravity and the base of the articles but less than the distance between the base and the top of the articles.

7. Apparatus according to claim 4, wherein the upper end of said chute is spaced from said throat a distance about equal to the distance the center of gravity is located from the base of the articles, and said support is spaced from the upper end of said chute a distance greater than the distance between the center of gravity and the base of the articles.

8. Apparatus for orienting elongate bottles having a base and a neck formed with an annular recess, said apparatus comprising a chute for the bottles having a delivery end, a throat spaced from the delivery end of said chute and a trapeze having a cross-bar adapted to be received by the recess of the bottles, said cross-bar being spaced from the delivery end of said chute a distance slightly less than the distance between the base and the upper end of the neck of the bottles.

9. Apparatus according to claim 8, wherein said cross-bar has a surface for frictionally engaging the bottle necks.

10. Apparatus according to claim 8, wherein said trapeze is swingingly suspended on said chute.

11. Apparatus according to claim 8, wherein said chute is inclined upwardly in the direction the articles are moved thereon and said cross-bar is at about the same level as the delivery end of said chute.

12. Apparatus for orienting haphazardly disposed elongate articles having a base and a top, said apparatus comprising a chute for the articles having a delivery end, a throat through which the articles pass spaced a predetermined distance before the delivery end of said chute, and a swingingly mounted support separated by an open space from the delivery end of said chute a distance slightly less than the distance between the top and base of the articles, said support being adapted to be engaged by the tops of the articles upon leaving the chute top first, said articles leaving said chute base first passing freely through said open space without engaging said support.

13. In an apparatus for orienting haphazardly disposed elongate articles having a base and a top portion, a chute for the articles having a delivery end, and a throat through which the articles pass in close fitting relation spaced a predetermined distance before the delivery end of said chute, said throat having a slot at an upper surface thereof adjacent said delivery end, said slot being slightly less in width than the diameter of said article base portion but being of a width slightly larger than the diameter of said article top portion, whereby in passing through said throat said article having its base portion first tilts on said delivery end with its top portion passing upwardly through said slot and drops from said chute, while when said article passes through said throat with its top portion first it drops from said chute only after the end of said base portion has passed entirely through the throat.

References Cited in the file of this patent

UNITED STATES PATENTS

| 1,381,287 | Danberg | June 14, 1921 |
| 1,481,330 | Schutz | Jan. 22, 1924 |
| 2,776,034 | Jordt | Jan. 1, 1957 |

FOREIGN PATENTS

| 437,350 | Germany | Nov. 19, 1926 |